Oct. 26, 1943.　　　B. R. DOWNEY ET AL　　　2,332,903
SAND SPREADER
Filed Oct. 6, 1941　　　4 Sheets-Sheet 1
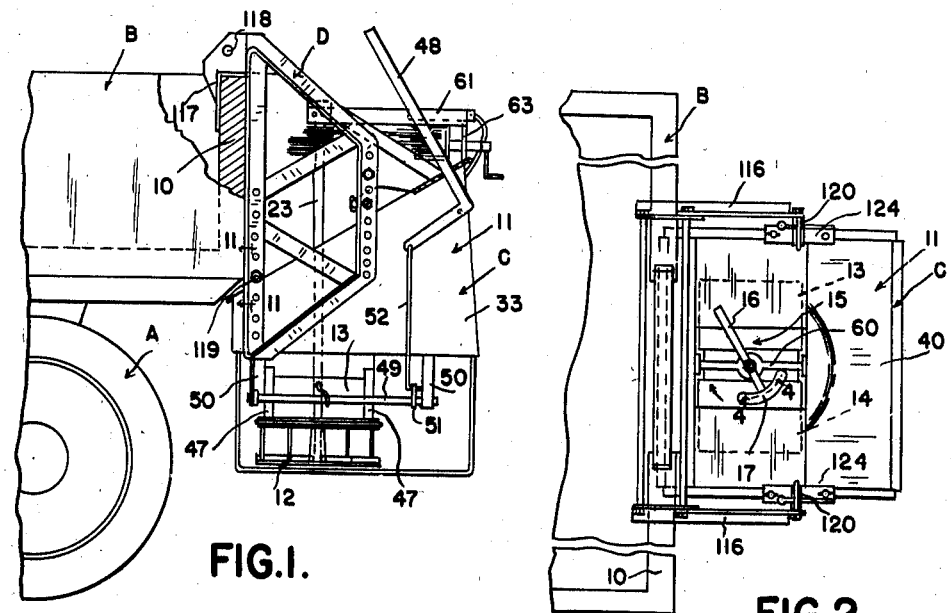
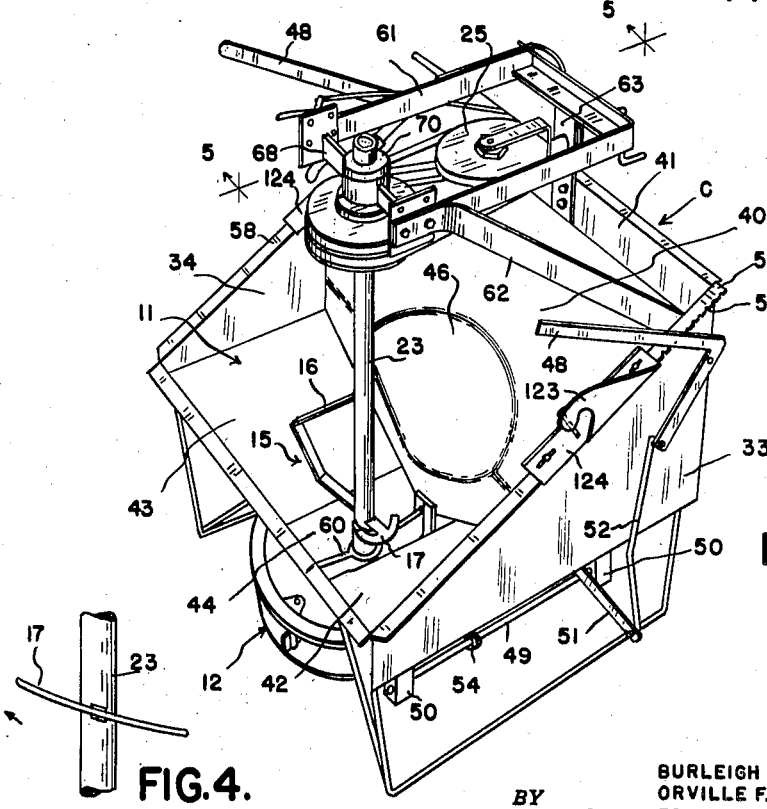
INVENTORS
BURLEIGH R. DOWNEY
ORVILLE F. EICHEN
FRANK E. BALLEW
BY
*ATTORNEYS*

Oct. 26, 1943.     B. R. DOWNEY ET AL     2,332,903
SAND SPREADER
Filed Oct. 6, 1941     4 Sheets-Sheet 2

INVENTORS
BURLEIGH R. DOWNEY
ORVILLE F. EICHEN
FRANK E. BALLEW
BY
ATTORNEYS

Oct. 26, 1943.      B. R. DOWNEY ET AL      2,332,903
SAND SPREADER
Filed Oct. 6, 1941      4 Sheets-Sheet 3

INVENTORS
BURLEIGH R. DOWNEY
ORVILLE F. EICHEN
FRANK E. BALLEW
BY
ATTORNEYS

Oct. 26, 1943. B. R. DOWNEY ET AL 2,332,903
SAND SPREADER
Filed Oct. 6, 1941 4 Sheets-Sheet 4

INVENTORS
BURLEIGH R. DOWNEY
BY ORVILLE F. EICHEN
FRANK E. BALLEW
ATTORNEYS

Patented Oct. 26, 1943

2,332,903

UNITED STATES PATENT OFFICE 2,332,903

SAND SPREADER

Burleigh R. Downey, Charlotte, Orville F. Eichen, Lansing, and Frank E. Ballew, Woodland, Mich.

Application October 6, 1941, Serial No. 413,896

15 Claims. (Cl. 275—8)

This invention relates generally to sanding apparatus and refers more particularly to portable apparatus adapted to be carried by a suitable vehicle such as a dump truck for distributing loose material such as sand, gravel, dirt, chloride and the like over a predetermined surface such as a highway, road or street.

One of the essential objects of the invention is to provide an apparatus of this type having a slow moving agitating means for feeding the loose material onto a fast moving spinner or distributor wheel.

Another object is to provide an apparatus wherein the slow moving agitating means and the fast moving distributor wheel have a common source of power.

Another object is to provide an apparatus wherein an increased driving torque for the agitating means is obtained so that such means will have greater power.

Another object is to provide an apparatus wherein the agitating means includes a stirrer for breaking up any tendency of the sand or other road material to bridge or cake in the hopper, and a pusher for positively or forcibly feeding the stirred material downwardly through the outlet of the hopper onto the distributor wheel.

Another object is to provide an apparatus wherein the distributor wheel is preferably driven by belts from a suitable motor, while the agitating means is driven from the distributor wheel by concentric shafts fixed respectively to the distributor wheel and agitating means and connected by cooperating pulleys and belts constituting a speed reduction unit.

Another object is to provide an apparatus wherein the common source of power aforesaid may be regulated by a single hand lever conveniently located at the top of the apparatus.

Another object of the invention is to provide an apparatus wherein a flexible tube clamped as a skirt upon the lower end of the agitator shaft and freely encircling an upstanding tubular projection of a crossbar carrying bearings for the distributor wheel shaft serves effectively to prevent the escape of grease or other lubricating means for the distributor wheel shaft and to exclude sand or other loose or abrasive material therefrom.

Another object is to provide an apparatus having a gravity hitch including hooks adapted to hang upon one or more pivots carried by the dump truck and also including adjustments for the hooks permitting the center of gravity of the apparatus to be located when the hooks are applied to said pivots.

Another object is to provide an apparatus that is simple in construction, economical to manufacture, easy to apply to a dump truck or other suitable vehicle, efficient in operation, and easy to repair when in service on the road.

Other objects, advantages and novel details of construction of this invention will be made more apparent as this description proceeds, especially when considered in connection with the accompanying drawings, wherein:

Figure 1 is a side elevation of an apparatus embodying our invention mounted upon the rear end of a truck, with parts of the latter broken away;

Figure 2 is a fragmentary top plan view of the structure shown in Figure 1;

Figure 3 is a perspective view of the sanding apparatus;

Figure 4 is a sectional view taken substantially on the line 4—4 of Figure 2;

Figures 5, 6:
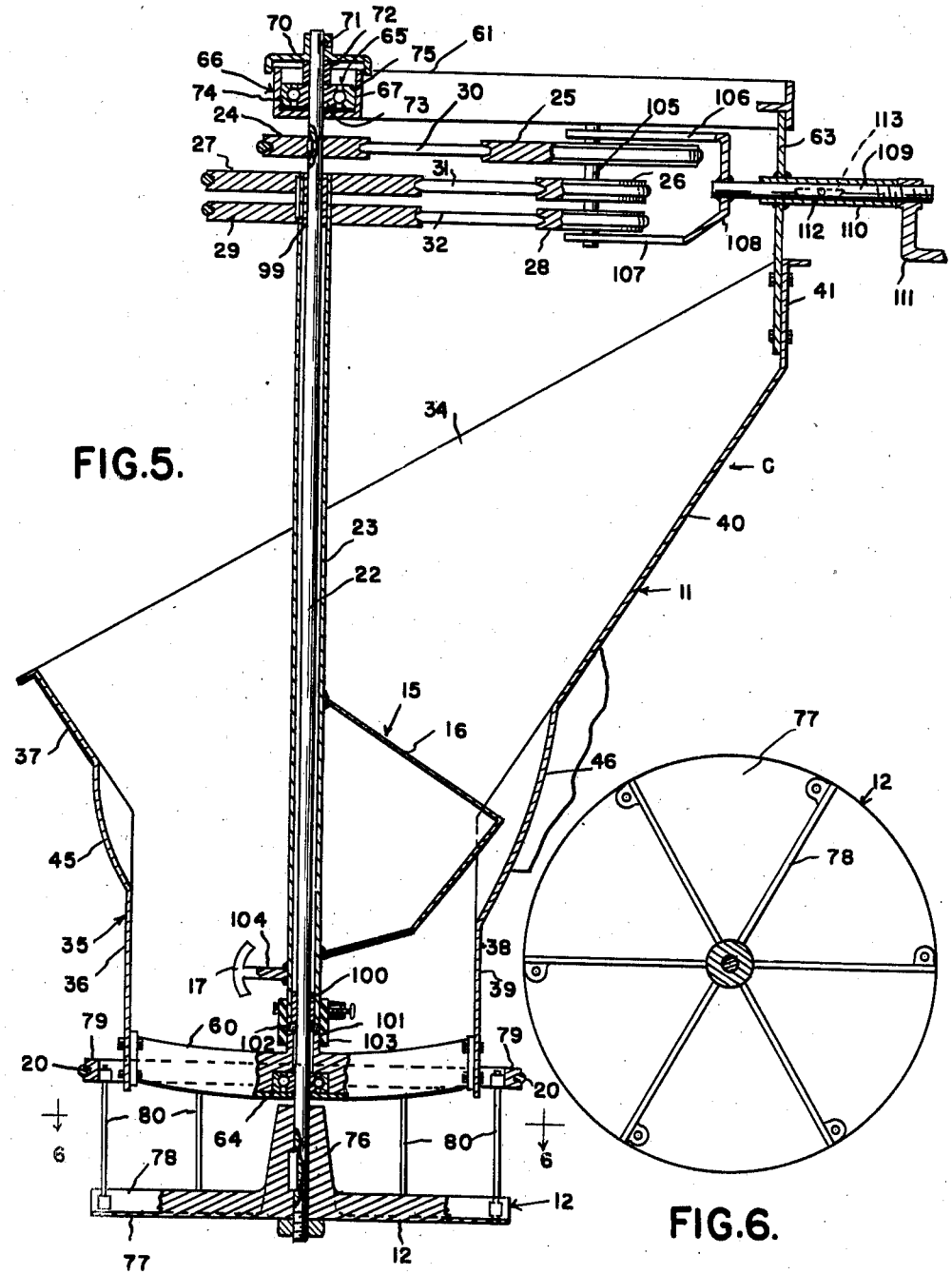
Figure 5 is a sectional view taken substantially on the line 5—5 of Figure 3.
Figure 6 is a sectional view taken substantially on the line 6—6 of Figure 5.
Figures 7, 8:
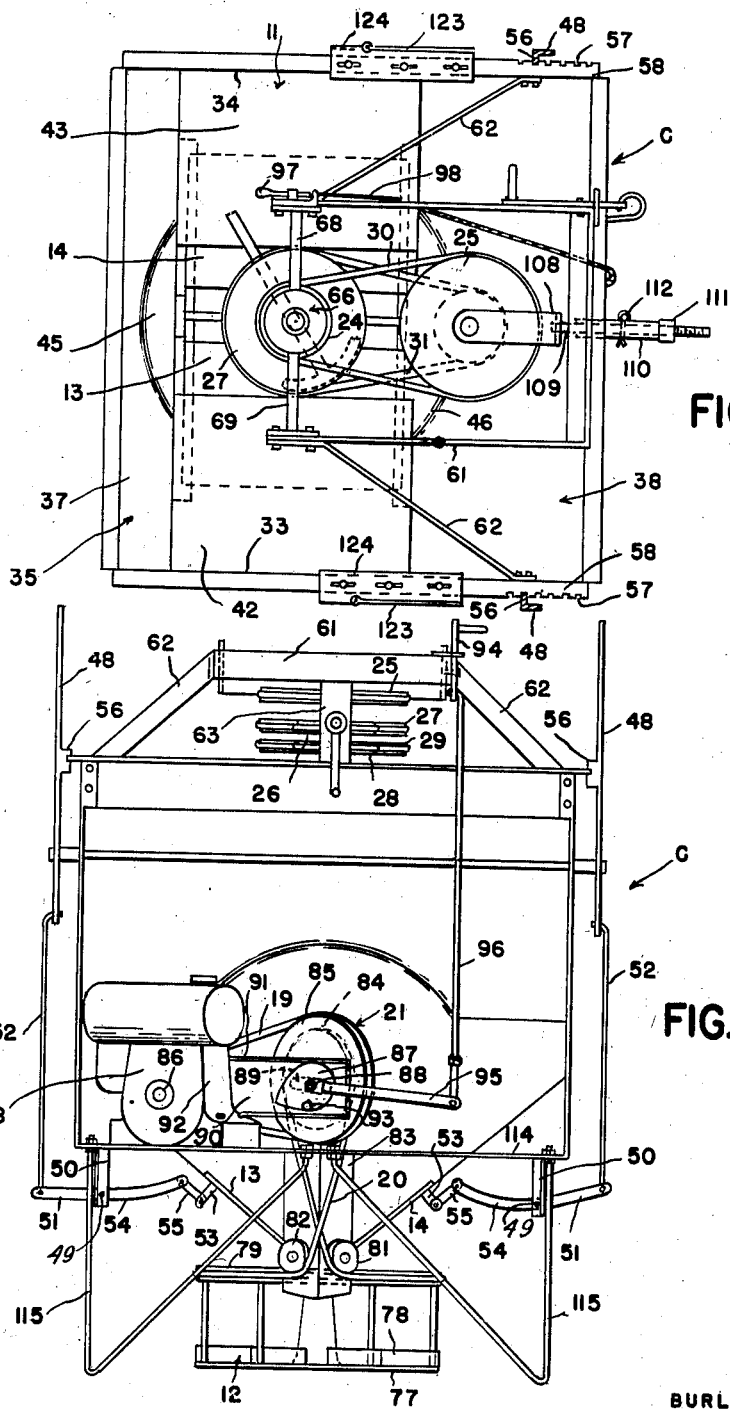
Figure 7 is a top plan view of the sanding apparatus.
Figure 8 is a rear elevation of the sanding apparatus.
Figure 9:
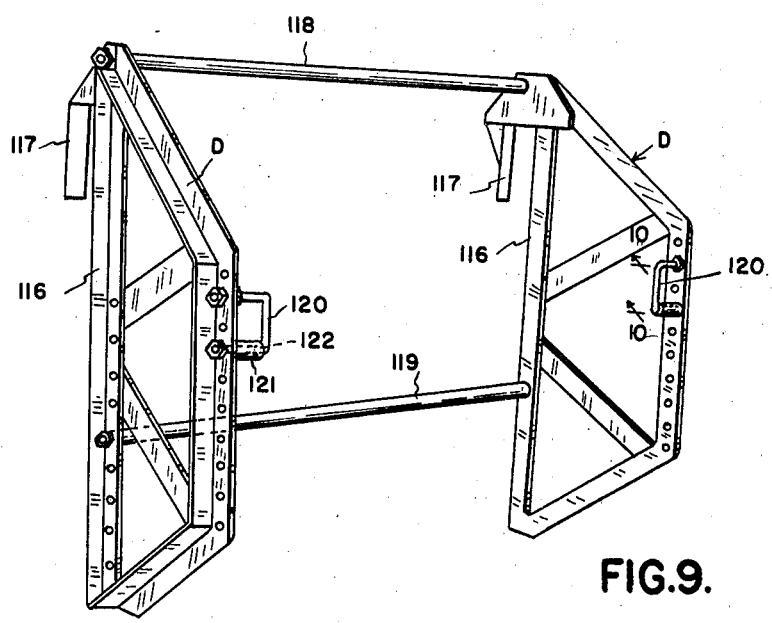
Figure 9 is a perspective view of the mounting for the apparatus.
Figures 10, 11:
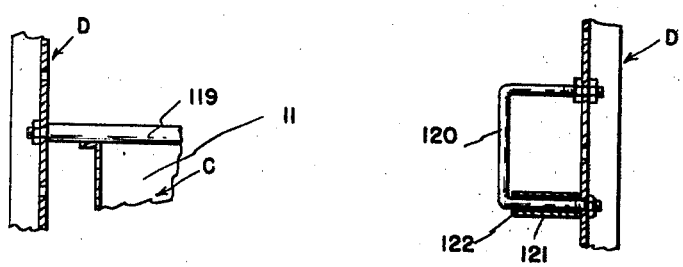
Figure 10 is a sectional view taken substantially on the line 10—10 of Figure 9.
Figure 11 is a sectional view taken substantially on the line 11—11 of Figure 1.

Referring now to the drawings, A is a dump truck having a tiltable body B, C is a sanding apparatus embodying our invention, and D is a mounting for the apparatus carried by the rear wall 10 of the truck body.

As shown, the sanding apparatus comprises a hopper 11 adapted to receive loose material such as sand, gravel, dirt, etc., from an outlet (not shown) in the rear wall 10 of the truck body, a rotary distributor wheel 12 beneath and adapted to receive the loose material from the hopper 11, slidable doors 13 and 14 for controlling the discharge of the loose material from the hopper 11 to the distributor wheel 12, agitating means 15 within the hopper 11 and including a stirrer 16 and a pusher 17 for the loose material, an internal combustion engine 18 constituting a common source of power for the distributor wheel 12 and agitating means 15, belts 19 and 29 and an intermediate double pulley 21 for transmitting power from the engine 18 to the distributor wheel 12, and means including concentric shafts 22 and 23, respectively, fixed to the distributor wheel 12 and agitating means 15 and connected by cooperating pulleys 24 to 29, inclusive, and belts 30 to 32, inclusive, constituting a speed reduction unit for transmitting power from the distributor wheel 12 to the agitating means 15.

The hopper 11 for the road material has upright side walls 33 and 34 that decrease in depth from the rear to the front thereof, a front wall 35 having an upright lower portion 36 and an upwardly and forwardly inclined upper portion 37, a rear wall 38 having an upright lower portion 39 and an upwardly and rearwardly inclined upper portion 40 provided at its upper edge with an upright portion 41, and inclined bottom walls 42 and 43 that extend inwardly and downwardly from the upright side walls 33 and 34 along the upright portions 36 and 39 of the front and rear walls and have their lower ends spaced apart to provide an outlet opening 44 through which the road material may be discharged onto the distributor wheel 12. To provide proper clearance for the stirrer 16 of the agitating means, the front and rear wheels 35 and 38, respectively, of the hopper are dished as at 45 and 46, respectively.

The doors 13 and 14 for controlling the discharge of the road material through the outlet 44 of the hopper 11 onto the distributor wheel 12 are slidable in guides 47 on the underside of the inclined bottom walls 42 and 43 and may be operated by any suitable means such as the hand levers 48. Preferably these levers are in the form of bell cranks and are pivoted upon the outer sides of the upright wall members 33 and 34 adjacent the rear ends thereof. Shafts 49 are journaled in suitable hangers 50 suspended from the wall members 33 and 34, arms 51 are rigid with said shafts, links 52 are terminally connected to the bell crank levers 48 and arms 51, arms 53 are rigid with the doors 13 and 14, levers 54 are rigid with the shafts 49, and links 55 are terminally connected to the arms 53 and levers 54. In order that the doors 13 and 14 may be retained in any adjusted position, the hand levers 48 have lateral flanges 56 that are engageable with serrations or notches 57 in the outer edges of lateral flanges 58 at the upper edges of the upright wall members 33 and 34.

Located within the opening 44 in the bottom of the hopper is a crossbar 60 rigid with the lower upright portions 36 and 39, respectively, of the front and rear walls, while above the hopper is a substantially horizontal frame 61 supported by diagonal bars 62 from the upright side walls 33 and 34 of the hopper and by an upright bar 63 from the uppermost upright portion 41 of the rear wall.

The shaft 22 for the distributor wheel is journaled in bearings 64 and 65, respectively, carried by the crossbar 60 and the frame 61. Preferably the lower bearings 64 are in a recess in the underside of the crossbar 60, while the upper bearings 65 are within a sectional housing 66 carried by the frame 61. The cup-shaped section 67 of the housing is rigid with portions 68 and 69 of the frame, while the cover section 70 of this housing is removable and normally is secured by a screw 71 to the shaft 22, suitable clearance being provided between the cover 70 and the cup-shaped section 67 of the housing to permit the cover to rotate with the shaft when the latter is rotating. A tubular sleeve 72 is provided on the shaft 22 between the cover 70 and the inner race 73 of the bearing 65, while a relatively thin washer 74 is provided in the housing 66 between the bottom thereof and the outer race 75 of the bearing. Thus, a thrust bearing is provided at the upper end of the shaft 22, and the inner race 73 is spaced sufficiently above the bottom of the housing 66 to avoid wear.

The distributor wheel 12 has a hub 76 keyed to the shaft 22 at its lower end beneath the crossbar 60 and is provided at the lower end of the hub with a solid disk-like body 77 having radially extending ribs 78 on the upper surface thereof. A peripherally grooved wheel 79 for the belt 29 is supported by uprights 80 rigid with the disk-like body 77 of the distributor wheel. Preferably this belt 29 is reeved on pulleys 81 and 82 carried by an angle bar 83 depending from the rear wall 38 of the hopper and on the smaller section 84 of the double pulley 21. The belt 19 is reeved on the larger section 85 of the double pulley 21 and on a pulley (not shown) carried by the drive shaft 86 of the internal combustion engine.

In the present instance, an eccentric 87 is used to move the shaft 88 for the double pulley 21 back and forth in an elongated slot 89 in the web 90 of a channel bar 91 rigid with the engine block 92 to cause the pulley 21 to move toward or away from the engine 18 and thus slacken or tighten the belt 19. This in effect constitutes a clutch for controlling the operation of the distributor wheel 12 from the engine 18. The eccentric 87 is mounted on the shaft 88 and is pivoted on a pin 93 rigid with the web 90 of the channel bar.

For actuating the eccentric 87, there is a hand lever 94 pivoted upon the frame 61, a lever 95 rigid with the eccentric, and a longitudinally adjustable rod 96 extending between and terminally connected to said levers 94 and 95. Any suitable remote control means such as the hand lever 97 carried by the frame 61 may be used to actuate the throttle cable 98 of the engine 18.

The shaft 23 for the agitating means 15 is tubular and is concentric with the shaft 22 for the distributor wheel 12. Preferably this tubular shaft is located between the crossbar 60 and the frame 61 and is sleeved on suitable bushings 99 and 100, respectively, on the shaft 22. Between the lower end of the tubular shaft 23 and an upstanding tubular portion 101 of the crossbar 60 is a spacer ring or washer 102, while clamped upon the tubular shaft 23 and depending like a skirt over the tubular portion 101 of the crossbar is a flexible tube 103 that prevents the escape of grease, oil or other lubricating means for the shaft 22 and excludes therefrom dust, dirt, sand or any other foreign substance that might have an abrasive action on the shaft 22 or associated parts.

The agitating means 15 for the road material in the hopper 11 is welded or otherwise rigidly secured to the tubular shaft 23 adjacent its lower end. As shown, the stirrer 16 is a substantially V-shaped bar that opens toward and is terminally secured to one side of the tubular shaft 23, while the pusher 17 is an arcuate bar that inclines or curves downwardly from one end thereof to the other and is carried at the outer end of an arm 104 projecting laterally from the diametrically opposite side of the tubular shaft 23 just below the lower end of the stirrer 16. Preferably the stirrer 16 is designed to break up any tendency of the sand or other road material in the hopper to bridge or cake, while the pusher 17 functions to positively and forcibly feed the stirred material downwardly through the outlet 44 of the hopper onto the distributor wheel 12.

For transmitting power from the distributor wheel shaft 22 to the tubular shaft 23 for the agitating means, the pulley 24 is keyed to the shaft 22 between the upper end of the tubular shaft 23 and the frame 61, the pulley 25 is keyed to a vertical stub shaft 105 journaled in the arms 106 and 107 of a yoke 108, the belt is reeved on the pulleys 24 and 25, the pulleys 26 and 27 are keyed respectively to the stub shaft 105 and tubular shaft 23, the belt 31 is reeved on the pulleys 26 and 27, the pulleys 28 and 29 are keyed respectively to the stub shaft 105 and tubular shaft 23, and the belt 32 is reeved on the pulleys 28 and 29. As shown, the pulley 25 is larger than the pulley 24 while the pulleys 26 and 28 are alike and are smaller than the pulleys 27 and 29, hence this assembly of pulleys and belts constitutes a speed reduction unit for the tubular shaft 23.

Preferably the yoke 108 is rigid with a rod 109 that is slidable lengthwise in a tube 110 extending through and rigid with the upright bar 63. A hand crank 111 threadedly engages the rod 109 beyond the outer end of the tube 110, while a cotter pin 112 extends through the rod 109 and engages elongated slots 113 in diametrically opposite sides of the tube 110 to prevent the rod 109 from turning. Hence, the hand crank 111 may be turned on the rod 109 to slide it in or out to loosen or tighten the belts 30 to 32, inclusive, on their respective pulleys. This in effect constitutes a clutch for controlling the operation of the shaft 23 from the shaft 22.

In the present instance, the internal combustion engine 18 is carried by a platform 114 at the lower edges of and rigid with the upright side walls 33 and 34, and such platform is provided with depending ground engaging legs 115 for supporting the apparatus when it is not carried by the mounting D on the rear end of the truck body B.

The mounting D is embodied in a separate application, Serial No. 413,887, filed October 6, 1941, by Herbert R. Moore, which issued July 6, 1943, as U. S. Patent No. 2,323,345. Preferably the mounting includes a pair of laterally spaced upright frames 116 provided with hooks 117 for supporting engagement with the upper edge of the rear wall 10 of the truck body, spreader bars 118 and 119 extending between and secured to said spaced frames, gravity hitch U-bolt brackets 120 carried by the frames, and tubular sleeves 121 on the lower arms 122 of the U-bolts forming bearings for the hook-shaped portions 123 of brackets 124 carried by the upright wall members 33 and 34 of the hopper. As shown, these brackets 124 have a sliding adjustment on the hopper so that the center of gravity of the sanding apparatus may be located when it is applied to the mounting D.

In use, the sanding apparatus C may be readily applied to the dump truck body B by first placing the hooks 117 of the mounting D over the upper edge of the rear wall 10 of the dump truck body, and then placing the hook-shaped portions 123 of the brackets 124 carried by the hopper upon the bearings 122 of the mounting D. In this connection the U-bolts 120 carrying the bearings 122 are adjustable vertically on the frames 116 to position the distributor wheel 12 close to the ground, and the lowermost spreader bar 119 is likewise adjustable on the frames 116 to be in proper position to serve as an abutment or stop for the hopper 11 when, for example, the truck A is stopped suddenly while traveling over a road, to thereby prevent the distributor wheel 12 from striking and being damaged by the rear drawbar (not shown) or other rearward projection of the truck. Once applied as aforesaid, the apparatus will, by the action of gravity, be in an upright position so that the distributor wheel 12 will be parallel to the ground and, accordingly, will distribute the road material horizontally over the road.

The doors 13 and 14 may be operated according to the work to be done. For example, if both sides of a road are to be covered by road material, then both doors are opened. If the left side only of the road is to be covered, then the left-hand door only is opened so the material will be directed in that direction by the closed inclined right-hand door, and vice-versa if it is desired to cover the right-hand side only of a road. As the distributor wheel 12 rotates, the ribs 78 thereof will throw the material outwardly over the road.

Preferably the distributor wheel 12 has approximately 200 R. P. M., while the tubular shaft 23 and agitating means 15 carried thereby have approximately 50 R. P. M. However, it is apparent that this ratio may be varied as desired. As a result, an increased torque is obtained and the agitating means has greater power. When rotating, the stirrer 16 will effectively break up any tendency of the road material to cake or bridge in the hopper, while the pusher 17 will forcibly feed the material downwardly through the opening 44 toward the distributor wheel 12. Thus, this construction is capable of handling satisfactorily wet road material such as wet sand if necessary.

The eccentric 87 and associated parts serve in effect as a clutch to control operation of both the distributor wheel 12 and agitating means 15, while the yoke 108 and associated parts including the hand crank 111 likewise serve as a clutch for the agitating means 15 only. The speed of the engine 18 may be regulated by the hand lever 97. Thus, the apparatus is complete and practical for the purposes for which it is designed and can handle any loose material for distribution over any predetermined surface.

What we claim as our invention is:

1. An apparatus of the class described having a hopper for road material, a distributor wheel below the hopper, means within the hopper for agitating the material and for force feeding the same onto the distributor wheel, a power plant, clutch controlled means operable by said power plant for driving the distributor wheel, and clutch controlled means operable by said distributor wheel for driving the agitating means.

2. An apparatus of the class described having a hopper for road material, a crossbar at the bottom of the hopper having a shaft opening therein and an upstanding tubular portion at the upper end of said opening, a distributor wheel below the hopper, a shaft for said wheel extending through the opening in said crossbar, agitating means for the material within the hopper, a shaft for said agitating means concentric with the shaft aforesaid above the crossbar, and a flexible tube clamped on the last mentioned shaft and depending therefrom like a skirt over the upstanding tubular portion of the crossbar for preventing the escape of lubricating means for either of said shafts and for excluding road or foreign material therefrom.

3. An apparatus of the class described having a hopper for road material, a crossbar at the bottom of the hopper, a frame at the top of the hopper, a distributor wheel below the hopper, a shaft for said wheel journaled in bearings in said crossbar and frame, a tubular shaft concentric with the shaft aforesaid between the crossbar and frame, agitating means for the material carried by the tubular shaft within the hopper, a driving connection between said concentric shafts including an adjustable speed reduction unit functioning as a clutch, and means for adjusting said unit to control the driving connection.

4. An apparatus of the class described having a pair of concentrically arranged shafts, a distributor wheel fixed to one of said shafts, agitating means fixed to the second shaft, means connected to the distributor wheel for driving the first mentioned shaft, and means including a speed reduction unit for driving the second mentioned shaft from the first mentioned shaft.

5. An apparatus of the class described having a distributor wheel, a supporting shaft for said distributor wheel, a tubular shaft substantially concentric with the shaft first mentioned, one or more agitating elements on the tubular shaft, means connected to the distributor wheel for rotating the first mentioned shaft, and means including a speed reduction unit for driving the tubular shaft from the first mentioned shaft.

6. An apparatus of the class described having a rotary distributor wheel, a peripherally grooved wheel rigid with said distributor wheel, a power plant having a drive shaft provided with a pulley wheel, a structural member rigid with the power plant, two pulleys arranged side by side and having a common shaft slidable in the structural member, an endless driving element reeved on the drive shaft pulley wheel and on one of the two pulleys mentioned, an endless driving element reeved on the other of the two pulleys mentioned and on the peripherally grooved wheel aforesaid, and means for sliding the slidable shaft relative to the structural member to vary the tension of the first mentioned endless driving element.

7. An apparatus of the class described having an inner shaft and an outer shaft, a distributor wheel on the inner shaft, agitating means on the outer shaft, means connected to the distributor wheel for actuating the inner shaft, and means for driving the outer shaft from the inner shaft.

8. An apparatus of the class described having an inner shaft and an outer shaft, a distributor wheel on the inner shaft, agitating means on the outer shaft, means connected to the distributor wheel for actuating the inner shaft, and means including a speed change unit for driving the outer shaft from the inner shaft.

9. An apparatus of the class described adapted to be mounted upon and removed from a road vehicle and having a hopper provided at the bottom thereof with a discharge opening, a rotary distributor wheel beneath the hopper for receiving material from said discharge opening, a power plant for the rotary distributor wheel, and a platform for the power plant having supporting legs extending downwardly below the rotary distributor wheel for engagement with the ground when the apparatus is removed from the road vehicle, the construction and arrangement of said legs relative to the distributor wheel being such that said wheel will be spaced safely above the ground when said legs are in engagement with the ground, and said legs will not interfere materially with the distribution of material from said distributor wheel when the apparatus is mounted upon the road vehicle.

10. An apparatus of the class described having a hopper provided at the bottom thereof with an outlet, upright concentric shafts extending centrally of the hopper, means on one of said shafts within the hopper for agitating material within said hopper, means on the other of said shafts beneath said outlet for receiving and distributing over a given area the material that has been agitated, a source of power remote to the concentric shafts, means for driving the shaft for the distributing means from said source of power, and means including a clutch controlled speed reduction unit for driving the shaft for the agitating means from the shaft for the distributing means.

11. An apparatus of the class described having a hopper provided at the bottom thereof with an outlet, upright operatively connected concentric shafts within said hopper, the innermost shaft extending downwardly below the outer shaft, a cross bar carried by the hopper below the outer shaft and receiving the downward extension of the inner shaft, said cross bar having an upstanding tubular part spaced from but substantially in alignment with the lower end of the outer shaft, a tube sleeved on the lower end of the outer shaft and depending like a skirt over the upstanding tubular part of the cross bar to prevent escape of lubricant and to exclude dirt from the inner shaft, agitating means for material in the hopper carried by the outer shaft, and means carried by the downward extension of the inner shaft for receiving agitated material from the outlet of the hopper and distributing the same over a given area.

12. An apparatus of the class described having a hopper provided at the bottom thereof with an outlet, upright concentric shafts within said hopper, the innermost shaft having end portions extending respectively upwardly above and downwardly below the outer shaft, agitating means for material in the hopper carried by the outer shaft, means carried by the downward extension of the inner shaft for receiving agitated material from the outlet of the hopper and distributing the same over a given area, and a clutch controlled speed reduction unit connecting the upward extension of the inner shaft to the outer shaft.

13. An apparatus of the class described having a hopper for road material, a distributor wheel below the hopper, a shaft for said wheel, agitating means for the material within the hopper, a shaft for said agitating means concentric with the shaft aforesaid, a driving connection between said concentric shafts including an adjustable speed reduction unit functioning as a clutch, and means for adjusting said unit to control the driving connection.

14. An apparatus of the class described having a rotary distributor wheel, a drive wheel rigid with said distributor wheel, a power plant having a drive shaft provided with a pulley wheel, a structural member fixed relative to the power plant, two pulleys arranged side by side and having a common shaft carried by and adjustable relative to the structural member, an endless driving element reeved on the drive shaft pulley wheel and on one of the two pulleys mentioned, an endless driving element reeved on the other of the two pulleys mentioned and on the drive wheel mentioned, and means for adjusting the adjustable shaft relative to the structural member to vary the tension of one of the endless driving elements aforesaid.

15. An apparatus of the class described having a rotary distributor wheel, a drive wheel rigid with said distributor wheel, a power plant having a drive shaft provided with a pulley wheel, a structural member fixed relative to the power plant, two pulleys arranged side by side and having a common shaft carried by and adjustable relative to the structural member, an endless driving element reeved on the drive shaft pulley wheel and on one of the two pulleys mentioned, and an endless driving element reeved on the other of the two pulleys mentioned and on the drive wheel aforesaid.

BURLEIGH R. DOWNEY.
ORVILLE F. EICHEN.
FRANK E. BALLEW.